No. 763,816. PATENTED JUNE 28, 1904.
W. VOSPER.
DIE FOR CUTTING TAPER THREADS.
APPLICATION FILED DEC. 9, 1901.
NO MODEL.

WITNESSES: INVENTOR:
M. Marks William Vosper,
Ira B. Sessions By Anson Hall, His Atty.

THE NORRIS PETERS CO., PHOTO-LITHO., WASHINGTON, D. C.

No. 763,816. Patented June 28, 1904.

UNITED STATES PATENT OFFICE.

WILLIAM VOSPER, OF SANDUSKY, OHIO, ASSIGNOR TO THE TOLEDO PIPE THREADING MACHINE CO., OF TOLEDO, OHIO, A CORPORATION OF OHIO.

DIE FOR CUTTING TAPER THREADS.

SPECIFICATION forming part of Letters Patent No. 763,816, dated June 28, 1904.

Application filed December 9, 1901. Serial No. 85,193. (No model.)

*To all whom it may concern:*

Be it known that I, WILLIAM VOSPER, a citizen of the United States, residing at Sandusky, in the county of Erie and State of Ohio, have invented a new and useful Die for Cutting Taper Threads on the Ends of Metal Tubes or Bars, of which the following is a specification.

My invention relates to improvements in dies for threading wrought-iron pipe and other metal tubes; and the objects of my improvement are, first, to provide chasers or cutters that can be more easily supplied with oil or other lubricant while cutting, also giving the chips more room to escape, so they will not interfere in the backing off of the die; second, to reduce the power required for cutting a taper thread; third, to dispense with the burs which are left across the threads where the cutting edges of other dies for cutting tapers stop cutting. I attain these objects by means of the devices and arrangement of parts hereinafter described, and shown and illustrated in the accompanying drawings, in which—

Figure 1:
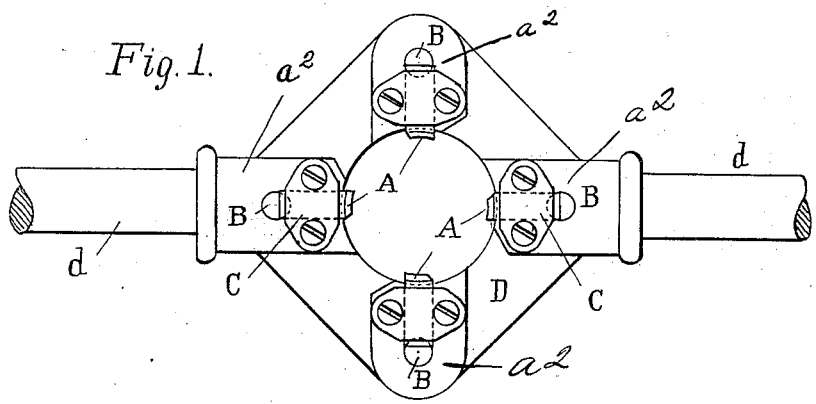
Figure 2:
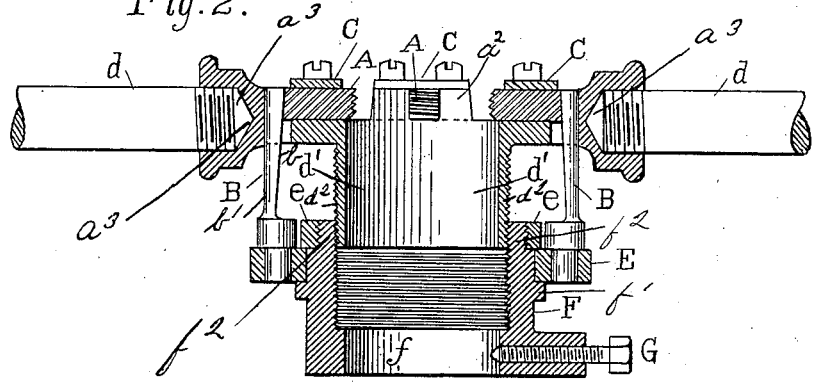

Figure 1 is an end elevation of my device, and Fig. 2 a central longitudinal sectional elevation of the same.

Like letters of reference indicate like parts in both views.

In the drawings, D is the die-carrying head, upon the outer face of which are supported a series of dies or chasers A, which slide radially endwise and freely in the guides $a^2$, projecting beyond the face of the die-carrying head, and held within said guides by the clamping or holding plates C. The work-holder F is internally threaded at $f$ to engage the external screw-threads $d^2$ on the sleeve $d'$, formed integral with the die-carrying head D, and is provided with one or more set-screws G, by means of which the object or work to be threaded is clamped immovably in the work-holder.

The work-holder F is provided with a flange $f'$, upon which is rotatably supported the ring or collar E, an internally-screw-threaded ring $e$ being disposed upon the work-holder at $f^2$ above the ring or collar E to prevent relative longitudinal movement between the work-holder and ring or collar E, but permitting relative rotation of such parts.

Rigidly secured to the ring or collar E are the pins B B, which project through suitable holes in the head D adjacent the rear ends of the chasers A, said holes coinciding with the paths of the chasers A as they move endwise. The pins B B have a taper $b$ at one side, which tapered portion engages the rear ends of the chasers while the straight side $b'$ moves against the wall of the hole in the head D, and preferably the rear ends of the chasers are beveled to engage the bevel of the pins.

It will be noted that two of the opposite guides $a^2$ project radially from the head D to provide recesses $a^3$, with which engage the handles $d$, by which the die-head is turned.

The operation of my device is as follows: The work to be threaded is inserted through the openings in the work-holder and the internal sleeve $d'$ until it comes in contact with the inner side of the chasers A, which are ground with suitable lead. The clamping-screws are now tightened and the head carrying the cutters is revolved upon the object to be threaded by means of the handles, causing the parts D and the work-holder by means of their screw-threaded engagement to approach each other. The ring E and the pins B revolve with the head. As the work proceeds the inclined faces of the pins permit the chasers to recede radially, thus gradually increasing the diameter of the thread and forming a tapered thread which conforms to the taper of the pins B.

The chasers A are set out from the outer face of the head D, as shown, to allow the lubricant to be readily applied and to allow the cuttings to fall clear of the work. The face of the chasers being much narrower than the length of the thread and the first two or three teeth of the chasers doing the cutting, there will be no bur left, as in the case of ordinary dies, where all of the teeth cut at once and alike.

Having described my invention and its operation, what I claim, and desire to secure by Letters Patent, is—

1. The combination of a work-support having a threaded interior with a collar rotatably mounted thereon, tapering pins projecting from said collar, a die-head having a tubular threaded projection adapted to engage the screw-threads of the work-holder, and chasers having their rear ends arranged to engage the inner faces of the tapering pins.

2. The combination of a work-support, means for securing the object to be threaded to said work-support, a series of tapering pins, rotatable means upon said work-support carrying said pins, a die-head rotatably and longitudinally movable upon the work-support, and chasers mounted upon the die-head and engaging the tapering pins.

3. In a die for cutting tapered threads, a work-support, means for securing the work-support to the object to be threaded, a collar rotatably mounted upon the work-support and carrying a series of tapering pins, a die-head rotatably and longitudinally mounted upon the work-support, holes in said die-head through which the tapering pins project, and chasers mounted upon the die-head and having their rear ends in engagement with the tapering pins.

In testimony whereof I have signed my name to this specification in the presence of two subscribing witnesses.

WILLIAM VOSPER.

Witnesses:
W. L. FIESINGER,
E. S. STEPHENS.